US011326446B2

(12) United States Patent
Hensarling et al.

(10) Patent No.: US 11,326,446 B2
(45) Date of Patent: May 10, 2022

(54) COMPACT LOGGING WHILE DRILLING LOOK AROUND AND LOOK AHEAD TOOL

(71) Applicant: Halliburton Energy Services, Inc., Houston, TX (US)

(72) Inventors: Jesse Kevin Hensarling, Cleveland, TX (US); Matthew Chase Griffing, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 16/361,803

(22) Filed: Mar. 22, 2019

(65) Prior Publication Data

US 2020/0300085 A1 Sep. 24, 2020

(51) Int. Cl.
*E21B 49/00* (2006.01)
*E21B 49/08* (2006.01)
*E21B 47/12* (2012.01)

(52) U.S. Cl.
CPC .............. *E21B 49/00* (2013.01); *E21B 49/08* (2013.01); *E21B 47/12* (2013.01)

(58) Field of Classification Search
CPC ........... E21B 49/00; E21B 49/08; E21B 47/12
See application file for complete search history.

(56) References Cited

U.S. PATENT DOCUMENTS

| 5,345,179 | A | * | 9/1994 | Habashy | .................. | G01V 3/30 |
| | | | | | | 324/338 |
| 2004/0059514 | A1 | * | 3/2004 | Bittar | ...................... | G01V 3/28 |
| | | | | | | 702/7 |
| 2013/0144529 | A1 | | 6/2013 | Seydoux et al. | | |
| 2013/0213714 | A1 | * | 8/2013 | Fulda | ........................ | G01V 3/30 |
| | | | | | | 175/50 |
| 2014/0249754 | A1 | * | 9/2014 | Donderici | ................. | E21B 7/04 |
| | | | | | | 702/7 |
| 2015/0276968 | A1 | | 10/2015 | Frey | | |
| 2015/0338542 | A1 | * | 11/2015 | Donderici | ................ | G01V 3/28 |
| | | | | | | 702/7 |

(Continued)

OTHER PUBLICATIONS

Khalil, H. et al., Fjellanger, J. P. (2018). Successful Implementation of Real-Time Look-Ahead Resistivity Measurements in the North Sea. SPE-191340-MS, SPE Norway One Day Seminar.

(Continued)

*Primary Examiner* — Thomas S McCormack
(74) *Attorney, Agent, or Firm* — Benjamin Ford; C. Tumey Law Group PLLC

(57) ABSTRACT

A compact sub assembly and a method for forming a deep antenna. The assembly may comprise a look-ahead deep transmitter is attached at about one end of the compact sub assembly, and a shallow transmitter is attached to the compact sub assembly and positioned adjacent to the look-ahead deep transmitter. A method of forming a deep antenna may comprise positioning a look-ahead deep transmitter adjacent to a shallow transmitter at about one end of a compact sub assembly, and connecting the look-ahead deep transmitter to a switching module through one or more deep switches, connecting the shallow transmitter to the switching module through one or more shallow switches, and closing the one or more deep switches and the one or more shallow switches to activate the look-ahead deep transmitter and the shallow transmitter to form the deep antenna.

19 Claims, 7 Drawing Sheets

(56) References Cited

U.S. PATENT DOCUMENTS

2016/0033670 A1  2/2016  Reiderman et al.
2017/0306701 A1  10/2017 Wu et al.
2018/0246247 A1  8/2018  Donderici et al.
2019/0128116 A1* 5/2019  Thiel .................... E21B 47/121

OTHER PUBLICATIONS

Monica Vik Constable, Looking ahead of the Bit While Drilling: From Vision to Reality. LPS Evening Lecture, The Geological Society, Apr. 2017.
PCT Application No. PCT/US2018/062641 dated Nov. 27, 2018.
International Search Report and Written Opinion for Application No. PCT/US2020/019790, dated Jun. 18, 2020.

* cited by examiner

COMPACT LOGGING WHILE DRILLING LOOK AROUND AND LOOK AHEAD TOOL

BACKGROUND

Wellbores drilled into subterranean formations may enable recovery of desirable fluids (e.g., hydrocarbons) using a number of different techniques. A logging tool may be employed in subterranean operations to determine wellbore and/or formation properties. As measurements from deeper formation away from the wellbores are more and more essential for reservoir exploration, logging tools may become longer and more sophisticated. Measurements by antennas on the logging tool may provide information that may allow an operator to determine wellbore and/or formation properties. However, a logging tool may stretch over a large area and further include large spacing and increased mechanical variance between antennas, wherein the antennas may include transmitters and receivers, such tool configurations introduce high-expenses in making the tool. Additionally, increasing length between sub-assemblies of the logging tool creates communication issues between transmitter subs and receiver subs, which may result in unreliable services for real-time operations. Finally, the long spacing in between transmitter and receivers prevents measurements of anisotropy and formation dip angle on a fine scale, which also in turn prevents reliable "look ahead" ability in front of a drilling bit during drilling operations, as the "look ahead" capability needs fine formation constraints behind the drilling bit.

BRIEF DESCRIPTION OF THE DRAWINGS

These drawings illustrate certain aspects of some examples of the present disclosure and should not be used to limit or define the disclosure.

DETAILED DESCRIPTION

The present disclosure relates generally to a compact sub assembly that may increase the capability of logging tools to look ahead of a drill bit during drilling operations. Increasing look ahead capabilities may allow an operator to steer a drill string with knowledge of the formation in front of the drill bit. As discussed below, a logging tool may include any number of downhole sub-assemblies, which may include antennas and/or coils, which may include a transmitter and/or receiver. A compact design of the sub-assemblies may move receiver and/or transmitter antennas and/or coils closer together, which may save space on the sub-assemblies and may allow for greater depth and capability for looking ahead of a drill bit.

Figure 1:
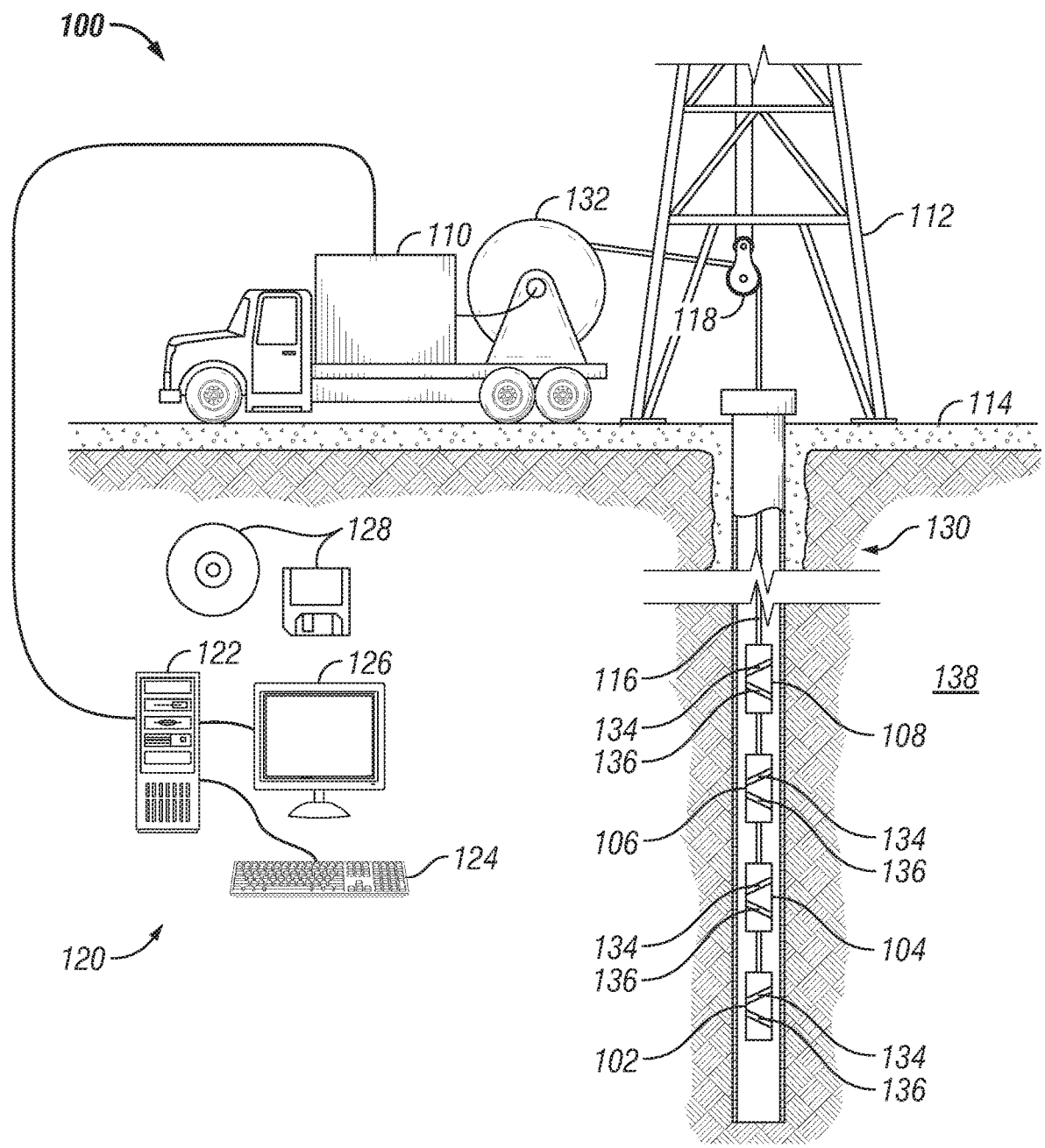
FIG. 1 illustrate an example of a well measurement system.

FIG. 1 illustrates a cross-sectional view of a well measurement system 100. As illustrated, well measurement system 100 may include a first sub assembly 102, a second sub assembly 104, a third sub assembly 106, and/or a fourth sub assembly 108. Each sub assembly may work together as a logging tool. It should be noted that well measurement system 100 may include only first sub assembly 102. As illustrated, first sub assembly 102, second sub assembly 104, third sub assembly 106, and/or fourth sub assembly 108 may attach to a vehicle 110. In examples, it should be noted that first sub assembly 102, second sub assembly 104, third sub assembly 106, and/or fourth sub assembly 108 may not be attached to a vehicle 110. First sub assembly 102, second sub assembly 104, third sub assembly 106, and/or fourth sub assembly 108 may be supported by rig 112 at surface 114. First sub assembly 102, second sub assembly 104, third sub assembly 106, and/or fourth sub assembly 108 may be tethered to vehicle 110 through conveyance 116. Conveyance 116 may be disposed around one or more sheave wheels 118 to vehicle 110. Conveyance 116 may include any suitable means for providing mechanical conveyance for first sub assembly 102, second sub assembly 104, third sub assembly 106, and/or fourth sub assembly 108, including, but not limited to, wireline, slickline, coiled tubing, pipe, drill pipe, downhole tractor, or the like. In some embodiments, conveyance 116 may provide mechanical suspension, as well as electrical connectivity, for first sub assembly 102, second sub assembly 104, third sub assembly 106, and/or fourth sub assembly 108. Conveyance 116 may include, in some instances, a plurality of electrical conductors extending from vehicle 110. Conveyance 116 may include an inner core of several electrical conductors covered by an insulating wrap. It should be noted that conveyance 116 may be a wireline, slickline, drill string (as described below in logging while drilling applications and/or measuring while drilling applications), coiled tubing, tractor, and/or the like. An inner and outer steel armor sheath may be wrapped in a helix in opposite directions around the conductors. The electrical conductors may be used for communicating power and telemetry between vehicle 110 and first sub assembly 102, second sub assembly 104, third sub assembly 106, and/or fourth sub assembly 108. Information from first sub assembly 102, second sub assembly 104, third sub assembly 106, and/or fourth sub assembly 108 may be gathered and/or processed by information handling system 120. For example, signals recorded by first sub assembly 102, second sub assembly 104, third sub assembly 106, and/or fourth sub assembly 108 may be stored on memory and then processed by first sub assembly 102, second sub assembly 104, third sub assembly 106, and/or fourth sub assembly 108. The processing may be performed real-time during data acquisition or after recovery of first sub assembly 102, second sub assembly 104, third sub assembly 106, and/or fourth sub assembly 108. Processing may alternatively occur downhole or may occur both downhole and at surface. In some embodiments, signals recorded by first sub assembly 102, second sub assembly 104, third sub assembly 106, and/or fourth sub assembly 108 may be conducted to information handling system 120 by way of conveyance 116. Information handling system 120 may process the signals, and the information contained therein may be displayed for an operator to observe and stored for future processing and reference. Information handling system 120 may also contain an apparatus for supplying control signals and power to first sub assembly 102, second sub assembly 104, third sub assembly 106, and/or fourth sub assembly 108.

Systems and methods of the present disclosure may be implemented, at least in part, with information handling system 120. Information handling system 120 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 120 may be a personal computer, a network storage device, or any other suitable device and may vary in size, shape, performance, functionality, and price. Information handling system 120 may include random access memory (RAM), one or more processing resources such as a central processing unit (CPU) 122 or hardware or software control logic, ROM, and/or other types of nonvolatile memory. Additional components of the information handling system 120 may include one or more disk drives, one or more network ports for communication with external devices as well as an input device 124 (e.g., keyboard, mouse, etc.) and output devices, such as a video display 126. Information handling system 120 may also include one or more buses operable to transmit communications between the various hardware components.

Alternatively, systems and methods of the present disclosure may be implemented, at least in part, with non-transitory computer-readable media 128. Non-transitory computer-readable media 128 may include any instrumentality or aggregation of instrumentalities that may retain data and/or instructions for a period of time. Non-transitory computer-readable media 128 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 112 includes a load cell (not shown) which may determine the amount of pull on conveyance 116 at the surface of wellbore 130. Information handling system 120 may include a safety valve which controls the hydraulic pressure that drives drum 132 on vehicle 110 which may reel up and/or release conveyance 116 which may move first sub assembly 102, second sub assembly 104, third sub assembly 106, and/or fourth sub assembly 108 up and/or down wellbore 130. The safety valve may be adjusted to a pressure such that drum 132 may only impart a small amount of tension to conveyance 116 over and above the tension necessary to retrieve conveyance 116 and/or first sub assembly 102, second sub assembly 104, third sub assembly 106, and/or fourth sub assembly 108 from wellbore 130. The safety valve is typically set a few hundred pounds above the amount of desired safe pull on conveyance 116 such that once that limit is exceeded; further pull on conveyance 116 may be prevented.

In examples, first sub assembly 102, second sub assembly 104, third sub assembly 106, and/or fourth sub assembly 108 may include a transmitter 134 and/or a receiver 136. It should be noted that transmitter 134, receiver 136, a plurality of transmitters, a plurality of receivers, a plurality of antennas, and/or any combination thereof may be referred to as an antenna, a co-located antenna, and/or a coil. Furthermore, any transmitter 134 or any receiver 136 may be a coil and/or an antenna. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from formation 138. During operations, transmitter 134 may broadcast a signal from first sub assembly 102, second sub assembly 104, third sub assembly 106, and/or fourth sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130, fluids, and/or formation 138.

Figure 2:
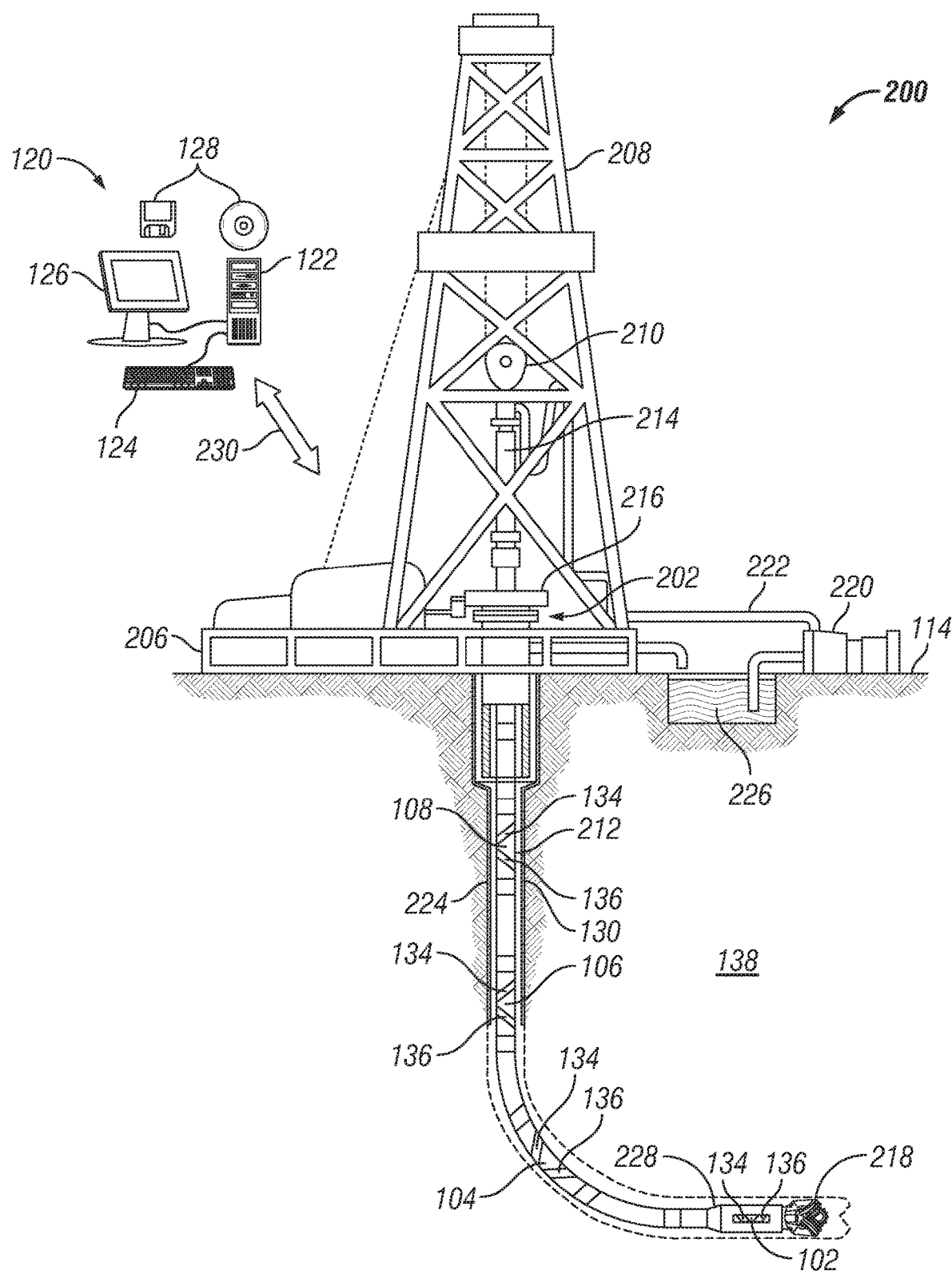
FIG. 2 illustrates another example of a well measurement system.

FIG. 2 illustrates an example in which first sub assembly 102, second sub assembly 104, third sub assembly 106, and/or fourth sub assembly 108 (e.g., Referring to FIG. 1) may be disposed in a drilling system 200. As illustrated, wellbore 130 may extend from a wellhead 202 into a subterranean formation 138 from surface 114 (e.g., Referring to FIG. 1). Generally, wellbore 130 may include horizontal, vertical, slanted, curved, and other types of wellbore geometries and orientations. Wellbore 130 may be cased or uncased. In examples, wellbore 130 may include a metallic material. By way of example, the metallic member may be a casing, liner, tubing, or other elongated steel tubular disposed in wellbore 130.

As illustrated in FIG. 2, wellbore 130 may extend through subterranean formation 138. Without limitation, wellbore 130 may extending generally vertically into the subterranean formation 138, however wellbore 130 may extend at an angle through subterranean formation 138, such as horizontal and slanted wellbores. For example, although FIG. 2 illustrates a vertical or low inclination angle well, high inclination angle or horizontal placement of the well and equipment may be possible. It should further be noted that while FIG. 2 generally depicts a land-based operation, those skilled in the art may recognize that the principles described herein are equally applicable to subsea operations that employ floating or sea-based platforms and rigs, without departing from the scope of the disclosure.

As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 114. Without limitation, drill bit 218 may include, roller cone bits, PDC bits, natural diamond bits, any hole openers, reamers, coring bits, and the like. As drill bit 218 rotates, it may create and extend wellbore 130 that penetrates various subterranean formations 138. A pump 220 may circulate drilling fluid through a feed pipe 222 to kelly 214, downhole through interior of drill string 212, through orifices in drill bit 218, back to surface 114 via annulus 224 surrounding drill string 212, and into a retention pit 226.

With continued reference to FIG. 2, drill string 212 may begin at wellhead 202 and may traverse wellbore 130. Drill bit 218 may be attached to a distal end of drill string 212 and may be driven, for example, either by a downhole motor and/or via rotation of drill string 212 from surface 114 (e.g., Referring to FIG. 1). Drill bit 218 may be a part of bottom hole assembly 228 at distal end of drill string 212. Bottom hole assembly 228 may further include first sub assembly 102 (e.g., Referring to FIG. 1). First sub assembly 102 may be disposed on the outside and/or within bottom hole assembly 228. It should be noted that second sub assembly 104, third sub assembly 106, and/or fourth sub assembly 108 may be disposed on drill string 212. Second sub assembly 104, third sub assembly 106, and/or fourth sub assembly 108 may be disposed on the outside and/or within drill string 212. First sub assembly 102, second sub assembly 104, third sub assembly 106, and/or fourth sub assembly 108 may include a transmitter 134 and/or a receiver 136 (e.g., Referring to FIG. 1). It should be noted that first sub assembly 102, second sub assembly 104, third sub assembly 106, and/or fourth sub assembly 108 may include a plurality of transmitters 134 and/or receivers 136. Transmitters 134 and/or receivers 136 may operate and/or function as described above. As will be appreciated by those of ordinary skill in the art, first sub assembly 102, second sub assembly 104, third sub assembly 106, and/or fourth sub assembly 108 may be a measurement-while drilling (MWD) or logging-while-drilling (LWD) system.

Without limitation, first sub assembly 102, second sub assembly 104, third sub assembly 106, and/or fourth sub assembly 108, transmitters 134, and/or receiver 136 may be connected to and/or controlled by information handling system 120 (e.g., Referring to FIG. 1), which may be disposed on surface 114. Without limitation, information handling system 120 may be disposed down hole in first sub assembly 102, second sub assembly 104, third sub assembly 106, and/or fourth sub assembly 108. Processing of information recorded may occur down hole and/or on surface 114. Processing occurring downhole may be transmitted to surface 114 to be recorded, observed, and/or further analyzed. Additionally, information recorded on information handling system 120 that may be disposed down hole may be stored until first sub assembly 102, second sub assembly 104, third sub assembly 106, and/or fourth sub assembly 108 may be brought to surface 114. In examples, information handling system 120 may communicate with first sub assembly 102, second sub assembly 104, third sub assembly 106, and/or fourth sub assembly 108 through a communication line (not illustrated) disposed in (or on) drill string 212. In examples, wireless communication may be used to transmit information back and forth between information handling system 120 and first sub assembly 102, second sub assembly 104, third sub assembly 106, and/or fourth sub assembly 108. Information handling system 120 may transmit information to first sub assembly 102, second sub assembly 104, third sub assembly 106, and/or fourth sub assembly 108 and may receive as well as process information recorded by first sub assembly 102, second sub assembly 104, third sub assembly 106, and/or fourth sub assembly 108. In examples, a downhole information handling system (not illustrated) may include, without limitation, a microprocessor or other suitable circuitry, for estimating, receiving and processing signals from first sub assembly 102, second sub assembly 104, third sub assembly 106, and/or fourth sub assembly 108. Downhole information handling system (not illustrated) may further include additional components, such as memory, input/output devices, interfaces, and the like. In examples, while not illustrated, first sub assembly 102, second sub assembly 104, third sub assembly 106, and/or fourth sub assembly 108 may include one or more additional components, such as analog-to-digital converter, filter and amplifier, among others, that may be used to process the measurements of first sub assembly 102, second sub assembly 104, third sub assembly 106, and/or fourth sub assembly 108 before they may be transmitted to surface 114. Alternatively, raw measurements from first sub assembly 102, second sub assembly 104, third sub assembly 106, and/or fourth sub assembly 108 may be transmitted to surface 114.

Any suitable technique may be used for transmitting signals from first sub assembly 102, second sub assembly 104, third sub assembly 106, and/or fourth sub assembly 108 to surface 114, including, but not limited to, wired pipe telemetry, mud-pulse telemetry, acoustic telemetry, and electromagnetic telemetry. While not illustrated, first sub assembly 102, second sub assembly 104, third sub assembly 106, and/or fourth sub assembly 108 may include a telemetry subassembly that may transmit telemetry data to surface 114. Without limitation, an electromagnetic source in the telemetry subassembly may be operable to generate pressure pulses in the drilling fluid that propagate along the fluid stream to surface 114. At surface 114, pressure transducers (not shown) may convert the pressure signal into electrical signals for a digitizer (not illustrated). The digitizer may supply a digital form of the telemetry signals to information handling system 120 via a communication link 230, which may be a wired or wireless link. The telemetry data may be analyzed and processed by information handling system 120.

As illustrated, communication link 230 (which may be wired or wireless, for example) may be provided that may transmit data from first sub assembly 102, second sub assembly 104, third sub assembly 106, and/or fourth sub assembly 108 to an information handling system 120 at surface 114. Information handling system 120 may include a central processing unit 122 (e.g., Referring to FIG. 1), a video display 126 (e.g., Referring to FIG. 1), an input device 124 (e.g., keyboard, mouse, etc.) (e.g., Referring to FIG. 1), and/or non-transitory computer-readable media 128 (e.g., optical disks, magnetic disks) (e.g., Referring to FIG. 1) that may store code representative of the methods described herein. In addition to, or in place of processing at surface 114, processing may occur downhole.

First sub assembly 102, second sub assembly 104, third sub assembly 106, and/or fourth sub assembly 108 may include a transmitter 134 and/or a receiver 136. In examples, first sub assembly 102, second sub assembly 104, third sub assembly 106, and/or fourth sub assembly 108 may operate with additional equipment (not illustrated) on surface 114 and/or disposed in a separate well measurement system (not illustrated) to record measurements and/or values from subterranean formation 138. During operations, transmitter 134 may broadcast a signal from first sub assembly 102, second sub assembly 104, third sub assembly 106, and/or fourth sub assembly 108. Transmitter 134 may be connected to information handling system 120, which may further control the operation of transmitter 134. Additionally, receiver 136 may measure and/or record signals broadcasted from transmitter 134. Receiver 136 may transfer recorded information to information handling system 120. Information handling system 120 may control the operation of receiver 136. For example, the broadcasted signal from transmitter 134 may be reflected by subterranean formation 138. The reflected signal may be recorded by receiver 136. The recorded signal may be transferred to information handling system 120 for further processing. In examples, there may be any suitable number of transmitters 134 and/or receivers 136, which may be controlled by information handling system 120. Information and/or measurements may be processed further by information handling system 120 to determine properties of wellbore 130 (e.g., Referring to FIG. 1), fluids, and/or subterranean formation 138.

Figure 3:
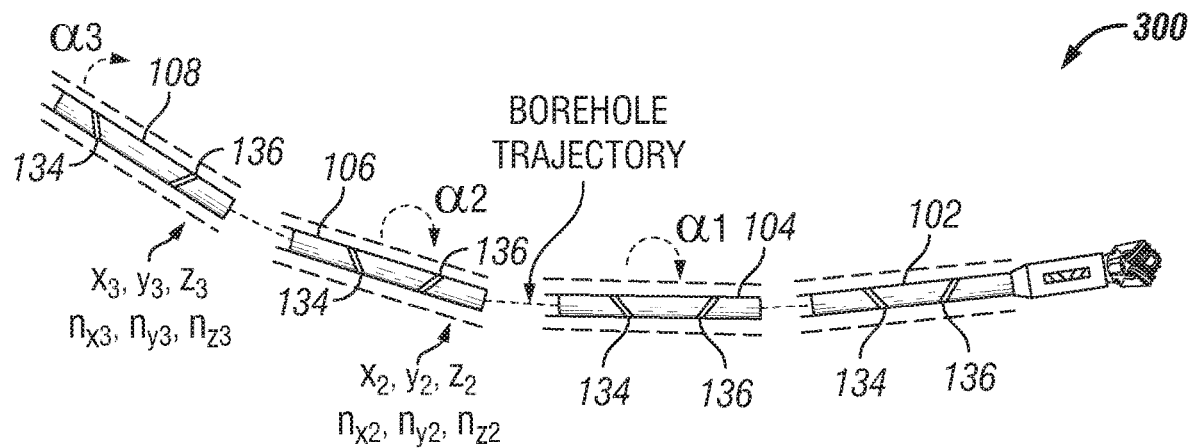
FIG. 3 illustrates an example of a logging tool.

As illustrated in FIG. 3, a logging tool 300 may include first sub assembly 102, second sub assembly 104, third sub assembly 106, and/or fourth sub assembly 108 (e.g., Referring to FIG. 1). As illustrated, longer spacing between transmitters 134 and/or receiver 136 between first sub assembly 102, second sub assembly 104, third sub assembly 106, and/or fourth sub assembly 108 may make it difficult to decouple multi-components from spaced antennas. Conventional methods use depth shifting or averaging to create pseudo co-located antennas, which may work accurately for traditional one sub resistivity tools, where there may not be an azimuth offset between transmitter 134 and receiver 136. However, when an azimuth offset may be between transmitter 134 and receiver 136, the conventional way to decouple multi-components becomes troublesome and inaccurate. For example, a ninety-degree azimuth offset between transmitter 134 and receiver 136 may lead to inaccurate measurements in the form of a singularity. As disclosed below, a method may be utilized to decouple multi-components from spaced antennas with any azimuth offset between transmitter 134 and receiver 136, and thus provides accurate and stable component signals as inputs for inversion calculations for any configurations of logging tool 300 or formation properties Logging tool 300 (e.g., Referring to FIG. 3) may include first sub assembly 102, second sub assembly 104, third sub assembly 106, and/or fourth sub assembly 108. For logging tool 300 with tilted transmitter 134 and receiver 136 (normally LWD tool, e.g., referring to FIG. 2), or logging tool 300 with transmitter 134, which may be tri-axial, and receiver 136 (normally a conveyance, e.g., referring to FIG. 1), responses from first sub assembly 102, second sub assembly 104, third sub assembly 106, and/or fourth sub assembly 108 may be broken into the following components:

$$\begin{bmatrix} Z_{XX} & Z_{XY} & Z_{XZ} \\ Z_{YX} & Z_{YY} & Z_{YZ} \\ Z_{ZX} & Z_{ZY} & Z_{ZZ} \end{bmatrix} \quad (1)$$

where Z symbolizes mutual impedance which is complex number, $Z_{xx}$, $Z_{yy}$, $Z_{zz}$ are known as the direct-coupling components and $Z_{xy}$, $Z_{yx}$, $Z_{xz}$, $Z_{zx}$, $Z_{yz}$, $Z_{zy}$ are known as the cross-coupling components.

Figure 4:
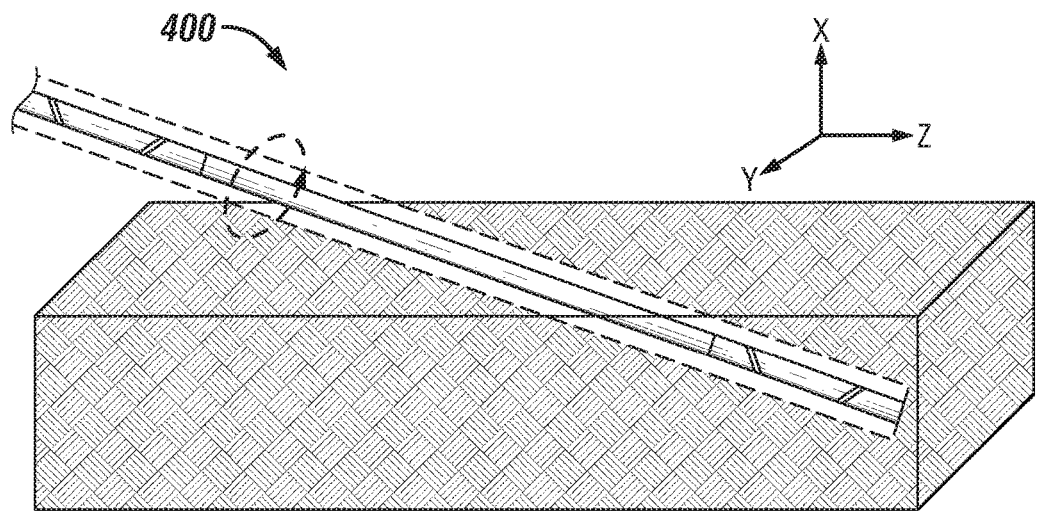
FIG. 4 illustrate a logging tool in an orientation schematic.

Based on rotating model 400, as illustrated in FIG. 4, which may represent first sub assembly 102, second sub assembly 104, third sub assembly 106, and/or fourth sub assembly 108, any response from any transmitter 134 and receiver 136 combinations may be produced from the components:

$$Z_R(\beta) = \begin{bmatrix} \sin\theta_t \cos\beta \\ \sin\theta_t \sin\beta \\ \cos\theta_t \end{bmatrix}^T \begin{bmatrix} Z_{xx} & Z_{yx} & Z_{zx} \\ Z_{xy} & Z_{yy} & Z_{zy} \\ Z_{xz} & Z_{yz} & Z_{zz} \end{bmatrix} \begin{bmatrix} \sin\theta_r \cos(\beta+\beta_{ref}) \\ \sin\theta_r \sin(\beta+\beta_{ref}) \\ \cos\theta_r \end{bmatrix} \quad (2)$$

where $Z_R(\beta)$ is the response for a transmitter 134-receiver 136 pair at first sub assembly 102, second sub assembly 104, third sub assembly 106, and/or fourth sub assembly 108 bin azimuth, $\beta$ is first sub assembly 102, second sub assembly 104, third sub assembly 106, and/or fourth sub assembly 108 rotating azimuth, $\beta_{ref}$ is first sub assembly 102, second sub assembly 104, third sub assembly 106, and/or fourth sub assembly 108 face offset between transmitter 134 and receiver 136, $\theta_t$ is the tilt angle of transmitter 134, $\theta_r$ is the tilt angle of receiver 136.

Here, Equation (2) may be further written as the following form with a use curve fitting algorithm to obtain parameters $Z_A$, $Z_B$, $Z_C$, $Z_D$:

$$Z_R(\beta') = Z_A \cos(2\beta' + \beta_{ref}) + Z_B \cos\beta' + Z_C \sin\beta' + Z_D \quad (3)$$

where $$\begin{cases} \beta' = \beta - \beta_{ref} \\ Z_A = (C_{xx} - C_{yy})/2 \\ Z_B = C_{xx} \cos\beta_{ref} + C_{xx} \\ Z_C = -C_{xx} \sin\beta_{ref} \\ Z_D = C_{xx} + (C_{xx} + C_{yy})\cos\beta_{ref}/2 \end{cases} \quad (4)$$

where $$\begin{cases} C_{xx} = Z_{xx}\sin\theta_t\sin\theta_r & C_{yx} = Z_{yx}\sin\theta_t\sin\theta_r & C_{zx} = Z_{zx}\cos\theta_t\sin\theta_r \\ C_{xy} = Z_{xy}\sin\theta_t\sin\theta_r & C_{yy} = Z_{yy}\sin\theta_t\sin\theta_r & C_{zy} = Z_{zy}\cos\theta_t\sin\theta_r \\ C_{xz} = Z_{xz}\sin\theta_t\sin\theta_r & C_{yz} = Z_{yz}\sin\theta_t\cos\theta_r & C_{zz} = Z_{zz}\cos\theta_t\cos\theta_r \end{cases} \quad (5)$$

As a result, two co-located receivers 136 for a transmitter 134, may calculate the components from the curve fitted signals as:

$$\begin{cases} Z_{AB1} = (Z_{xx} \sin\theta_t \sin\theta_{r1} - Z_{yy} \sin\theta_t \sin\theta_{r1})/2 \\ Z_{BB1} = Z_{yx} \cos\theta_t \sin\theta_{r1} \cos\beta_{ref1} + Z_{yx} \sin\theta_t \cos\theta_{r1} \\ Z_{CB1} = -Z_{zx} \cos\theta_t \sin\theta_{r1} \sin\beta_{ref1} \\ Z_{DB1} = Z_{yx} \cos\theta_t \cos\theta_{r1} + (Z_{yx} \sin\theta_t \sin\theta_{r1} + Z_{yy} \sin\theta_t \sin\theta_{r1})\cos\beta_{ref1}/2 \\ Z_{AB2} = (Z_{xx} \sin\theta_t \sin\theta_{r2} - Z_{yy} \sin\theta_t \sin\theta_{r2})/2 \\ Z_{BB2} = Z_{yx} \cos\theta_t \sin\theta_{r2} \cos\beta_{ref2} + Z_{yx} \sin\theta_t \cos\theta_{r2} \\ Z_{CB2} = -Z_{zx} \cos\theta_t \sin\theta_{r2} \sin\beta_{ref2} \\ Z_{DB2} = Z_{yx} \cos\theta_t \cos\theta_{r2} + (Z_{yx} \sin\theta_t \sin\theta_{r2} + Z_{yy} \sin\theta_t \sin\theta_{r2})\cos\beta_{ref2}/2 \end{cases} \Rightarrow \begin{cases} Z_{xx} \\ Z_{yy} \\ Z_{zz} \\ Z_{xx} \\ Z_{xx} \end{cases} \quad (6)$$

To decouple air-hang component signals from the tool air-hang response, Equations (3) to (6) may be simplified as:

$$Z_{AB} = Z_D \quad (7)$$

where $$Z_D = Z_{zz}\cos\theta_r\cos\theta_r + Z_{xx}\sin\theta_r\sin\theta_r\cos\beta_{ref} \quad (8)$$

Similarly, with two collocated coil receivers for the same transmitter, an operator may calculate the components from the air-hang response as:

$$\begin{cases} Z_{DB1} = Z_{xx} \cos\theta_t \cos\theta_{r1} + Z_{zx} \sin\theta_t \sin\theta_{r1} \cos\beta_{ref1} \\ Z_{DB2} = Z_{xx} \cos\theta_t \cos\theta_{r2} + Z_{zx} \sin\theta_t \sin\theta_{r2} \cos\beta_{ref2} \end{cases} \Rightarrow \begin{cases} Z_{xx} \\ Z_{xy} \end{cases} \quad (9)$$

Figure 5:
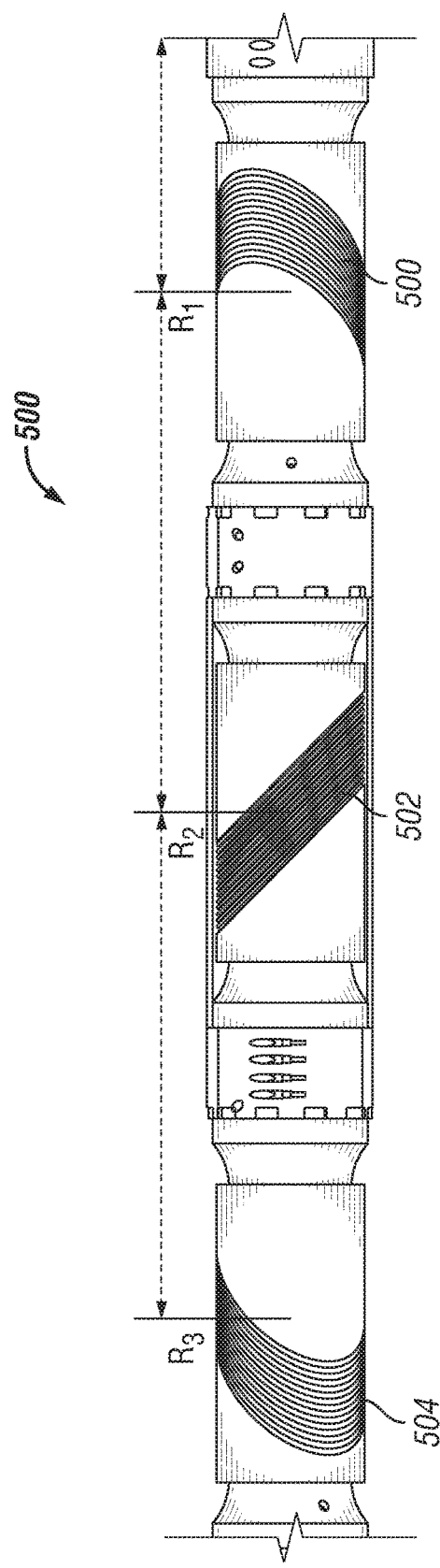
FIG. 5 illustrates a sub assembly of the logging tool.

FIG. 5 illustrates an example sub assembly 500 of logging tool 300 (e.g., referring to FIG. 3). It should be noted that example sub assembly 500 may be first sub assembly 102, second sub assembly 104, third sub assembly 106, and/or fourth sub assembly 108 (e.g., referring to FIG. 1 or 2). Due to mechanical constraints and antenna interference considerations, logging tool 300 may include a first antenna 502, a second antenna 504, and a third antenna 506 within one sub module may be spaced apart instead of co-located together. First antenna 502, second antenna 504, and third antenna 506 may have one hundred- and twenty-degrees azimuth offset between them. Each antenna may transmit and/or receive signals. These signals may be processed in an inversion scheme to determine formation properties and/or boundaries. Before inversion schemes may be utilized to determine formation properties, record component signals of first antenna 502, second antenna 504, and third antenna 506 may be determined through decoupling.

Figure 6:
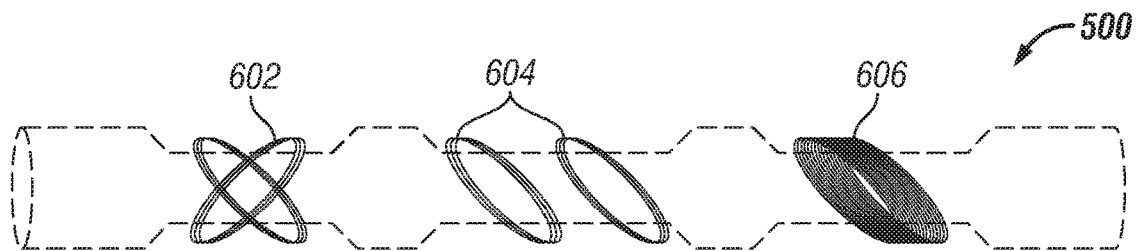
FIG. 6 illustrates a schematic of the sub assembly.

FIG. 6 illustrates a schematic drawing of example sub assembly 500 comprising co-located receivers 602, dual shallow transmitters 604, and/or look-ahead deep transmitters 606. The co-located receivers 602 and dual shallow transmitters 604 form a shallow spacing to obtain shallow, or fine resolution, formation measurements near the look-ahead deep transmitter 606. This allows measurements of anisotropy and formation dip angle on a fine scale, enabling reliable deep look-ahead capability by providing fine formation constraints near the look-ahead deep transmitter 606.

Figure 7A:
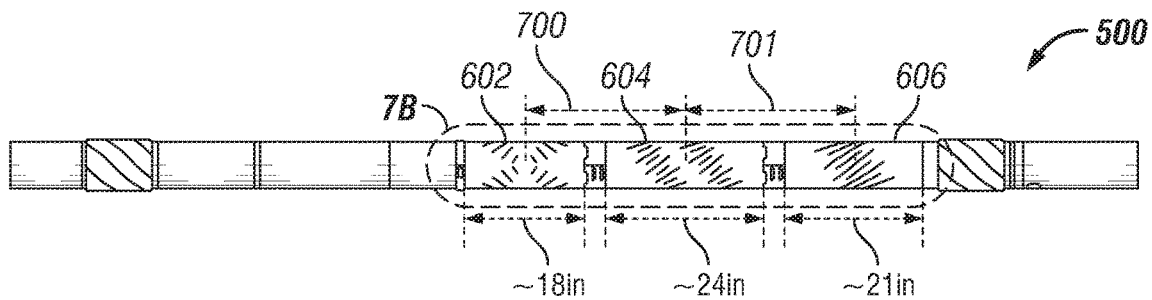
FIGS. 7A and 7B illustrate another example the sub assembly.
Figure 7B:
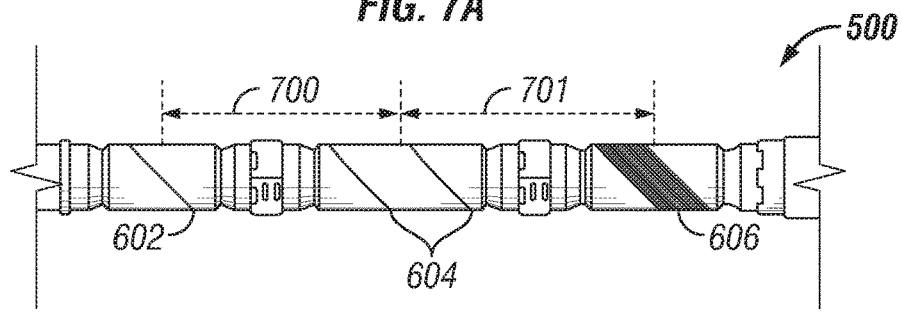

FIGS. 7A and 7B illustrate spacing between co-located receivers 602, dual shallow transmitters 604, and look-ahead deep transmitters 606 on sub assembly 500. Without limitation, a co-located receiver is a receiver that operates to receive signals that are at a frequency range of about 1 kHz to about 10 MHz and evaluates at least a portion of the formation from about 0 ft. (0 meters) to about 50 ft. (about 15 meters) from the wellbore. Without limitation, a shallow transmitter is a transmitter that operates at a frequency range of about 1 kHz to about 10 MHz and evaluates at least a portion of the formation from about 0 ft. (0 meters) to about 50 ft. (about 15 meters) from the wellbore. Shallow, or fine resolution, is defined as evaluation of at least a portion of the formation from about 0 ft. (0 meters) to about 50 ft. (about 15 meters) from the wellbore. Without limitation, a look-ahead deep transmitter is a transmitter that operates at a frequency range of about 100 Hz to about 1 MHz and evaluates at least a portion of the formation from about 10 ft. (about 1 meters) to about 300 ft. (about 90 meters) from the wellbore.

Figure 8:
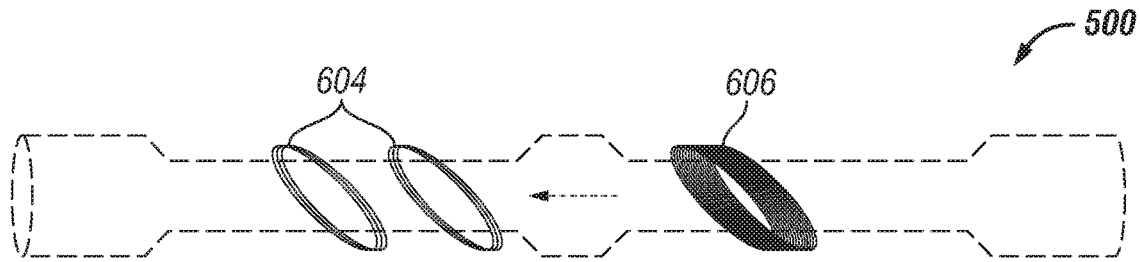
FIG. 8 illustrates a schematic of reducing the sub assembly to a compact sub assembly.
Figure 9:
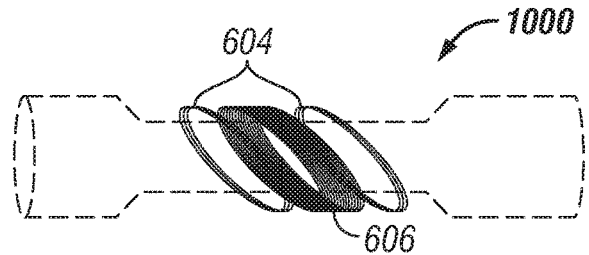
FIG. 9 illustrates at least a portion of the compact sub assembly.
Figure 10:
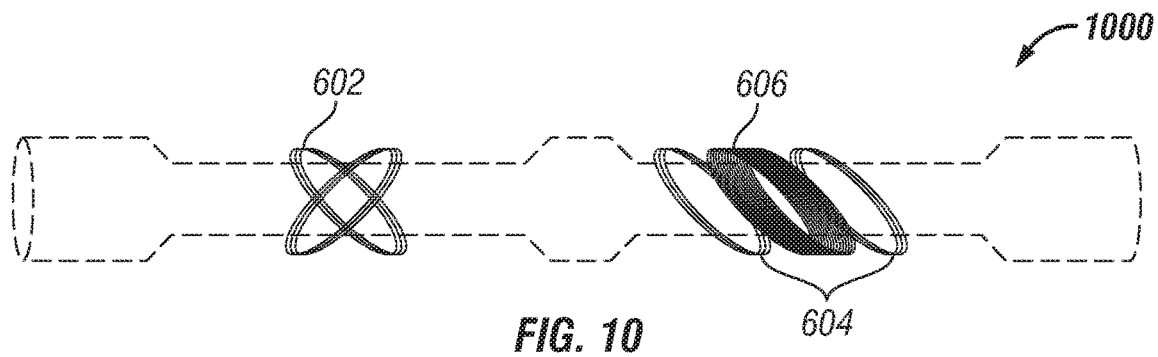
FIG. 10 illustrates a schematic of the compact sub assembly.

It should be noted that any transmitter and any receiver may be a coil or an antenna. As illustrated, co-located to transmitter spacing 700 is defined as a distance between a midpoint of co-located receivers 602 to a midpoint of dual shallow transmitters 604. Additionally, transmitter to look-ahead spacing 701 is defined as a distance between a midpoint of dual shallow transmitters 604 to a midpoint of look-ahead deep transmitters 606. As illustrated in FIG. 8, transmitter to look-ahead spacing 701 is removed and dual shallow transmitters 604 may be combined with look-ahead deep transmitters 606, as illustrated in FIGS. 8 and 9. This may decrease the length of sub assembly 500 by the distance of transmitter to look-ahead spacing 701. In examples, the distance of look-ahead spacing 701 may be about 2 ft. (about 0.5 meter). The reduction of about 2 ft. (about 0.5 meter) from sub assembly 500 may form a compact sub assembly 1000, as illustrated in FIGS. 8, 9, and 10, which may allow compact sub assembly 1000 to be utilized in more applications downhole on different conveyances. Without limitation, a compact sub assembly is about 1 ft. (about 0.3 meter) to about 25 ft. (about 8 meters) long.

FIG. 9 illustrates at least a portion of compact sub assembly 1000 comprising dual shallow transmitters 604 and look-ahead deep transmitters 606. As illustrated, dual shallow transmitters 604 and look-ahead deep transmitters 606 may be combined, as seen in FIG. 8, because dual shallow transmitters 604 and look-ahead deep transmitters 606 have similar orientation, which may reduce the impact on each device. This may result in a compact sub assembly 1000, as illustrated in FIG. 10. As illustrated in FIG. 10, co-located receivers 602 may be disposed in a similar area as logging tool 300 but dual shallow transmitters 604 and look-ahead deep transmitters 606 may be disposed adjacent to each other, which may reduce the length of compact sub assembly 1000. Within this disclosure, "Adjacent" is defined as shallow transmitters 604 and look-ahead deep transmitter 606 are placed or integrated into the same section or housing (i.e., compact sub assembly 1000). If the spacing between shallow transmitters 604 and look-ahead deep transmitter 606 is greater than approximately 1 ft (0.3 meter), both shallow transmitters 604 and look-ahead deep transmitter 606 will be disposed in separate sections and housings (i.e., a sub assembly), which increases collar length to accommodate the additional mechanical features. It should be noted that compact sub assembly 1000 may present additional opportunities for enhancement in conjunction with downhole electronics.

Figure 11:
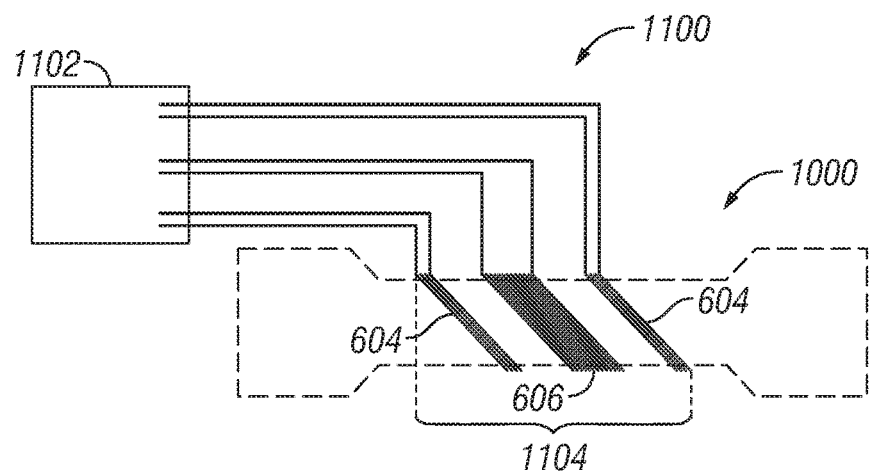
FIG. 11 illustrates an electronics configuration for the compact sub assembly.

FIG. 11 illustrates electronics configuration 1100 comprising a switching module 1102, which may take advantage of dual shallow transmitters 604 and look-ahead deep transmitters 606 to create a deep antenna 1104 to boost signal/sensitivity during deep look-ahead measurements. In examples switching module 1102 may be disposed at surface 114 (e.g., referring to FIGS. 1 and 2) and/or disposed on compact sub assembly 1000. Without limitation, switching module 1102 may be disposed on compact sub assembly 1000 and may be remotely controlled form surface 114. Information handling machine 120 may be used to control switching module 1102. It should be noted that deep antenna 1104 may be formed by operating dual shallow transmitters 604 and look-ahead deep transmitters 606 at the same time. To perform this operation, switching module 1102 may include switches (electro-mechanical relays, solid-state, transistors, etc.) to connect and disconnect dual shallow transmitters 604 and look-ahead deep transmitters 606 to form deep antenna 1104.

Figure 12:
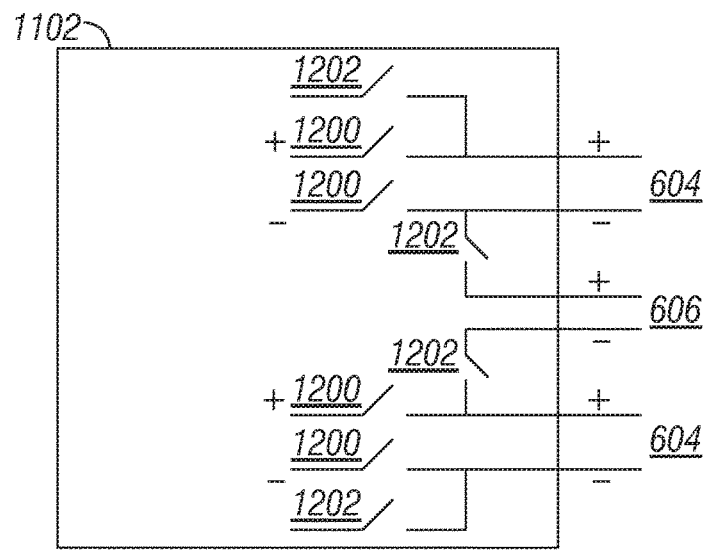
FIG. 12 illustrates a switching module.
Figure 13:
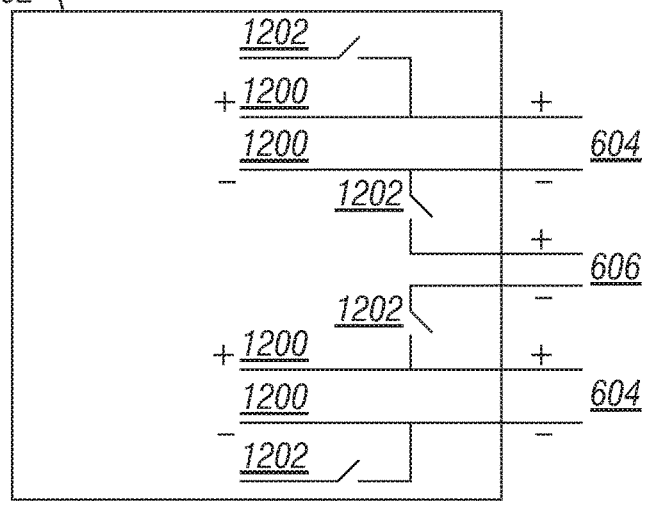
FIG. 13 illustrates an example of the switching module using one or more shallow switches.
Figure 14:
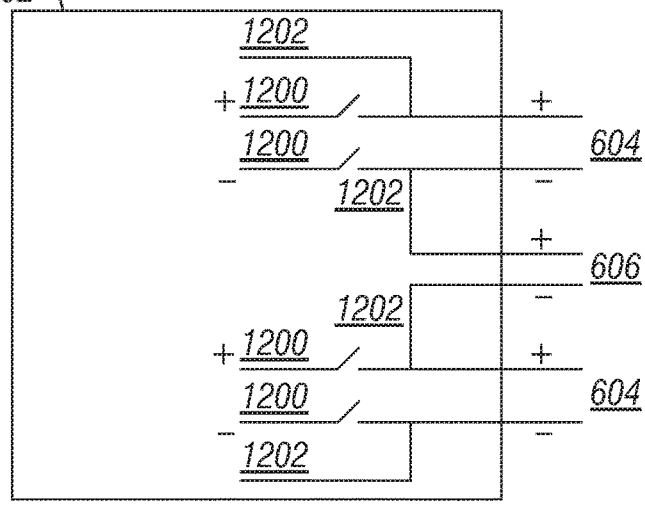
FIG. 14 illustrates another example of the switching module using one or more deep switches.

For example, FIG. 12 illustrates switching module 1102 which may include shallow switches 1200 and deep switches 1202. Without limitation, shallow switches 1200 may be connected to each antenna of dual shallow transmitters 604 and deep switches 102 may be connected to look-ahead deep transmitters 606. As illustrated in FIG. 13, during operations, compact sub assembly 1000 (e.g., referring to FIG. 10) may only operate dual shallow transmitters 604 to determine properties of formation 138 (e.g., referring to FIG. 1 or 2) which may be with about 10 feet (about 3 meters) of compact sub assembly 1000. To perform this operation shallow switches 1200 may be closed and deep switches 1202 may be open, which may only allow dual shallow transmitters 604 to operate. As illustrated in FIG. 14, during operations, compact sub assembly 1000 may only operate look-ahead deep transmitters 606 and dual shallow transmitters 604 simultaneously to determine properties of formation 138 which may be more than about 10 feet (about 3 meters) from compact sub assembly 1000. To perform this operation shallow switches 1200 may be open and deep switches 1202 may be closed, which may allow dual shallow transmitters 604 and look-ahead deep transmitters 606 to operate simultaneously in a deep mode.

Figure 15:
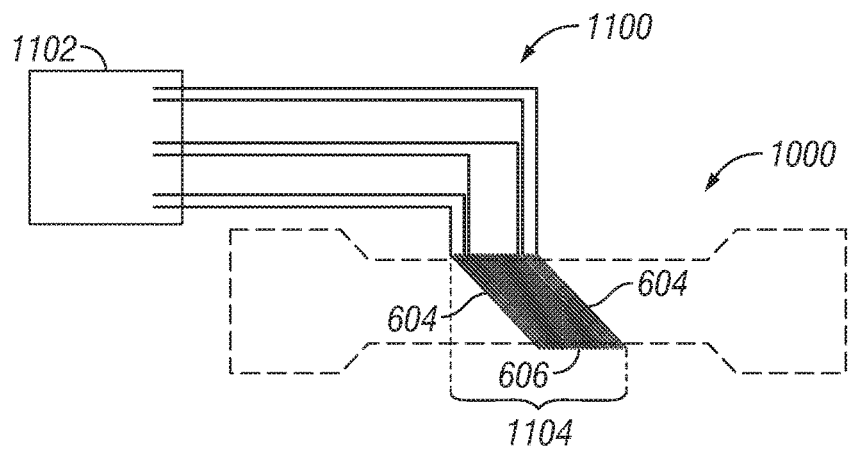
FIG. 15 illustrates a deep antenna on the compact sub assembly.

As illustrated in FIG. 15, adding the turns (or loops) of dual shallow transmitters 604 to look-ahead deep transmitters 606 in this way increases the signal strength/sensitivity of deep antenna 1104, enhancing look-ahead measurements and saving space on compact sub assembly 1000. Furthermore, electronics configuration 1100 may allow switching module 1102 to individually control dual shallow transmitters 604 and look-ahead deep transmitters 606, which may allow dual shallow transmitters 604 to not be physically spaced away from look-ahead deep transmitters 606. In examples, spacing of dual shallow transmitters 604 and size of look-ahead deep transmitters 606 may allow for dual shallow transmitters 604 to be turns/loops on either end (or anywhere in the middle) of look-ahead deep transmitters 606. Integrating dual shallow transmitters 604 into look-ahead deep transmitters 606 in this way may enable additional space savings near drill bit 218.

This method and system may include any of the various features of the compositions, methods, and system disclosed herein, including one or more of the following statements.

Statement 1: A compact sub assembly may comprise a look-ahead deep transmitter with a frequency range of about 100 Hz to 1 MHz is attached at about one end of the compact sub assembly; and a shallow transmitter with a frequency range of about 1 kHz to about 10 MHz is attached to the compact sub assembly and positioned adjacent to the look-ahead deep transmitter wherein the compact sub assembly has a length of about 1 foot to about 25 feet.

Statement 2. The compact sub assembly of statement 1, further comprising a second shallow transmitter disposed adjacent the look-ahead deep transmitter and opposite the shallow dual transmitter.

Statement 3. The compact sub assembly of statements 1 or 2, further comprising co-located receivers, wherein the co-located receivers are disposed at a second end of the compact sub assembly.

Statement 4. The compact sub assembly of statements 1 to 3, further comprising a switching module, wherein the switching module is disposed on the compact sub assembly.

Statement 5. The compact sub assembly of statement 4, wherein the switching module is connected to the look-ahead deep transmitter through one or more deep switches and the shallow transmitter through one or more shallow switches.

Statement 6. The compact sub assembly of statement 5, further comprising an information handling system, wherein the information handling system is connected to the switching module and controls the one or more shallow switches and the one or more deep switches.

Statement 7. The compact sub assembly of statement 6, wherein the information handling system is configured to activate the look-ahead deep transmitter with the one or more deep switches and the shallow dual transmitter with the one or more shallow switches to form a deep antenna.

Statement 8. A method of forming a deep antenna may comprise positioning a look-ahead deep transmitter with a frequency range of about 100 Hz to 1 MHz adjacent to a shallow transmitter with a frequency range of about 1 kHz to about 10 MHz at about one end of a compact sub assembly, wherein the compact subassembly has a length of about 1 foot to about 25 feet; and connecting the look-ahead deep transmitter to a switching module through one or more deep switches; connecting the shallow transmitter to the switching module through one or more shallow switches; and closing the one or more deep switches and the one or more shallow switches to activate the look-ahead deep transmitter and the shallow transmitter to form the deep antenna.

Statement 9. The method of statement 8, further comprising disposing a second shallow transmitter about the one end of the compact sub assembly.

Statement 10. The method of statement 9, wherein the second shallow transmitter is connected to switching module by the one or more shallow switches.

Statement 11. The method of statement 11, wherein closing the one or more shallow switches activates the shallow transmitter and the second shallow transmitter.

Statement 12. The method of statements 8 or 9, wherein the switching module is disposed on the compact sub assembly.

Statement 13. The method of statements 8, 9, or 13, wherein an information handling system is connected to the switching module and controls the deep switches and the shallow switches.

Statement 14. A well measurement system may comprise a compact sub assembly having a length of about 1 foot to about 25 feet, wherein the compact sub assembly comprises: a look-ahead deep transmitter with a frequency range of about 100 Hz to 1 MHz is attached about one end of the compact sub assembly; and a shallow transmitter with a frequency range of about 1 kHz to about 10 MHz is attached to the compact sub assembly and positioned adjacent to the look-ahead deep transmitter; and a conveyance, wherein the conveyance is attached to the sub assembly.

Statement 15. The well measurement system of statement 14, further comprising a switching module, wherein the switching module is connected to the look-ahead deep transmitter and the shallow transmitter, and wherein the switching module is disposed on the compact sub assembly.

Statement 16. The well measurement system of statements 14 or 15, wherein the well measurement system further comprises one or more sub-assemblies and at least one sub assembly is the compact sub assembly.

Statement 17. The well measurement system of statements 14 to 16, further comprising an information handling system, wherein the information handling system is connected to the switching module.

Statement 18. The well measurement system of statements 14 to 17, wherein the switching module is connected to the look-ahead deep transmitter by one or more deep switches and connected to the shallow transmitter by one or more shallow switches.

Statement 19. The well measurement system of statement 18, wherein the switching module is configured to activate the one or more deep switches and the one or more shallow switches to form a deep antenna.

Statement 20. The well measurement system of statements 14 to 18, further comprising co-located receivers, wherein the co-located receivers are disposed at a second end of the compact sub assembly.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A compact sub assembly comprising:
   a first shallow transmitters and second shallow transmitter, wherein the first and second shadow transmitters are electromagnetic transmitters, with a frequency range of about 1 kHz to about 10 MHz and attached to the compact sub assembly, wherein the compact sub assembly is a single housing, and has a length less than 15 feet; and
   a look-ahead deep transmitter disposed between the first shallow transmitter and the second shallow transmitter, wherein the look-ahead deep transmitter is an electromagnetic transmitter, with a frequency range of about 100 Hz and 1 MHz.

2. The compact sub assembly of claim 1, further comprising co-located receivers, wherein the co-located receivers are disposed at a second end of the compact sub assembly.

3. The compact sub assembly of claim 1, further comprising a switching module, wherein the switching module is disposed on the compact sub assembly.

4. The compact sub assembly of claim 3, wherein the switching module is connected to the look-ahead deep transmitter through one or more deep switches and the first shallow transmitter through one or more shallow switches.

5. The compact sub assembly of claim 4, further comprising an information handling system, wherein the information handling system is connected to the switching module and controls the one or more shallow switches and the one or more deep switches.

6. The compact sub assembly of claim 5, wherein the information handling system is configured to activate the look-ahead deep transmitter with the one or more deep switches and the first shallow transmitter with the one or more shallow switches to form a deep antenna.

7. A method of forming a deep antenna comprising:
   positioning a look-ahead deep transmitter, wherein the look-ahead deep transmitter is an electromagnetic transmitter, with a frequency range of about 100 Hz to 1 MHz adjacent to a first shallow transmitter and a second shallow transmitter, wherein the first and second shallow transmitters are electromagnetic transmitters, with a frequency range of about 1 kHz to about 10 MHz and attached to the compact sub assembly, wherein the compact sub assembly is a single housing, and has a length less than 15 feet;
connecting the look-ahead deep transmitter to a switching module through one or more deep switches;
connecting the first shallow transmitter to the switching module through one or more shallow switches; and
closing the one or more deep switches and the one or more shallow switches to activate the look-ahead deep transmitter and the shallow transmitter to form the deep antenna.

8. The method of claim 7, wherein the second shallow transmitter is connected to the switching module by the one or more shallow switches.

9. The method of claim 8, wherein closing the one or more shallow switches activates the first shallow transmitter and the second shallow transmitter.

10. The method of claim 7, wherein the switching module is disposed on the compact sub assembly.

11. The method of claim 7, wherein an information handling system is connected to the switching module and controls the deep switches and the shallow switches.

12. A well measurement system comprising:
a compact sub assembly is a single housing having a length less than 15 feet, wherein the compact sub assembly comprises:
a look-ahead deep transmitter, wherein the look-ahead deep transmitter is an electromagnetic transmitter, with a frequency range of about 100 Hz to 1 MHz is attached about one end of the compact sub assembly; and
a first shallow transmitter and a second shallow transmitter, wherein the first and second shallow transmitters are second electromagnetic transmitters, with a frequency range of about 1 kHz to about 10 MHz and attached to the compact sub assembly wherein the compact sub assembly is a single housing and has a length less than 15 feet; and
a conveyance, wherein the conveyance is attached to the sub assembly.

13. The well measurement system of claim 12, further comprising a switching module, wherein the switching module is connected to the look-ahead deep transmitter and the first shallow transmitter, and wherein the switching module is disposed on the compact sub assembly.

14. The well measurement system of claim 12, wherein the well measurement system further comprises one or more sub-assemblies and at least one sub assembly is the compact sub assembly.

15. The well measurement system of claim 12, further comprising an information handling system, wherein the information handling system is connected to a switching module.

16. The well measurement system of claim 12, further comprising a switching module is connected to the look-ahead deep transmitter by one or more deep switches and connected to the first shallow transmitter by one or more shallow switches.

17. The well measurement system of claim 16, wherein the switching module is configured to activate the one or more deep switches and the one or more shallow switches to form a deep antenna.

18. The well measurement system of claim 12, further comprising co-located receivers, wherein the co-located receivers are disposed at a second end of the compact sub assembly.

19. A compact sub assembly comprising:
a first shallow transmitter and a second shallow transmitter, wherein the first shallow transmitter and the second shallow transmitter are attached to the compact sub assembly, wherein the compact sub assembly is a single housing and a length less than 15 feet;
a look-ahead deep transmitter disposed between the first shallow transmitter and the second shallow transmitter; and
a deep antenna formed at least in part from the first shallow transmitter, the second shallow transmitter, and the look-ahead deep transmitter.

* * * * *

UNITED STATES PATENT AND TRADEMARK OFFICE
CERTIFICATE OF CORRECTION

PATENT NO. : 11,326,446 B2
APPLICATION NO. : 16/361803
DATED : May 10, 2022
INVENTOR(S) : Jesse Kevin Hensarling and Matthew Chase Griffing Page 1 of 2

It is certified that error appears in the above-identified patent and that said Letters Patent is hereby corrected as shown below:

In the Specification

Column 8, equation 4, Lines 3, 4, 5 should be:

$$Z_B = C_{zx} \cos \beta_{ref} + C_{zz}$$
$$Z_C = -C_{zx} \sin \beta_{ref}$$
$$Z_D = C_{zz} + (C_{xx} + C_{yy}) \cos \beta_{ref} / 2$$

Column 9, equation 6, Lines 1-8 should be:

$$Z_{AR1} = (Z_{xx} \sin \theta_t \sin \theta_{r1} - Z_{yy} \sin \theta_t \sin \theta_{r1})/2$$
$$Z_{BR1} = Z_{zx} \cos \theta_t \sin \theta_{r1} \cos \beta_{ref1} + Z_{zz} \sin \theta_t \cos \theta_{r1}$$
$$Z_{CR1} = -Z_{zx} \cos \theta_t \sin \theta_{r1} \sin \beta_{ref1}$$
$$Z_{DR1} = Z_{zz} \cos \theta_t \cos \theta_{r1} + (Z_{xx} \sin \theta_t \sin \theta_{r1} + Z_{yy} \sin \theta_t \sin \theta_{r1}) \cos \beta_{ref1} / 2$$
$$Z_{AR2} = (Z_{xx} \sin \theta_t \sin \theta_{r2} - Z_{yy} \sin \theta_t \sin \theta_{r2})/2$$
$$Z_{BR2} = Z_{zx} \cos \theta_t \sin \theta_{r2} \cos \beta_{ref2} + Z_{zz} \sin \theta_t \cos \theta_{r2}$$
$$Z_{CR2} = -Z_{zx} \cos \theta_t \sin \theta_{r2} \sin \beta_{ref2}$$
$$Z_{DR2} = Z_{zz} \cos \theta_t \cos \theta_{r2} + (Z_{xx} \sin \theta_t \sin \theta_{r2} + Z_{yy} \sin \theta_t \sin \theta_{r2}) \cos \beta_{ref2} / 2$$

Column 9, equation 7, please correct "ZAB" to --ZAIR--

Column 9, equation 8, please correct "cos$\theta_t$cos$\theta_r$" and "sin$\theta_t$sin$\theta_r$" to --cos $\theta_t$ cos $\theta_r$-- and --sin $\theta_t$ sin $\theta_r$-- respectively In the Claims Signed and Sealed this
Twelfth Day of July, 2022

Katherine Kelly Vidal
*Director of the United States Patent and Trademark Office*

Column 14, Line 32, please replace "transmitters and second shallow" with --transmitter and a second shallow--